United States Patent
Wohl et al.

(10) Patent No.: US 9,550,911 B2
(45) Date of Patent: Jan. 24, 2017

(54) FLUORINATED ALKYL ETHER EPOXY RESIN COMPOSITIONS AND APPLICATIONS THEREOF

(71) Applicant: The United States of America represented by the Administrator of the National Aeronautics and Space Administration, Washington, DC (US)

(72) Inventors: Christopher J. Wohl, Portsmouth, VA (US); John W. Connell, Yorktown, VA (US); Joseph G. Smith, Smithfield, VA (US); Emilie J. Siochi, Newport News, VA (US); John M. Gardner, Newport News, VA (US); Frank M. Palmieri, Hampton, VA (US)

(73) Assignee: The United States of America as represented by the Administrtor of the National Aeronautics and Space Administration, Washington, DC (US)

( * ) Notice: Subject to any disclaimer, the term of this patent is extended or adjusted under 35 U.S.C. 154(b) by 391 days.

(21) Appl. No.: 14/310,997

(22) Filed: Jun. 20, 2014

(65) Prior Publication Data
US 2015/0344748 A1   Dec. 3, 2015

Related U.S. Application Data

(60) Provisional application No. 61/984,528, filed on Apr. 25, 2014, provisional application No. 61/868,267, filed on Aug. 21, 2013.

(51) Int. Cl.
| | | |
|---|---|---|
| C09J 163/00 | (2006.01) |
| B05D 3/02 | (2006.01) |
| C08K 3/00 | (2006.01) |
| B05D 5/08 | (2006.01) |
| C09D 163/00 | (2006.01) |
| C08K 3/36 | (2006.01) |
| C08G 59/06 | (2006.01) |
| C08G 59/14 | (2006.01) |
| C08G 59/50 | (2006.01) |
| C08K 3/30 | (2006.01) |

(52) U.S. Cl.
CPC ............ *C09D 163/00* (2013.01); *C08G 59/066* (2013.01); *C08G 59/1438* (2013.01); *C08G 59/504* (2013.01); *C08G 2650/50* (2013.01); *C08K 2003/3009* (2013.01); *Y10T 428/30* (2015.01); *Y10T 428/31511* (2015.04); *Y10T 428/31529* (2015.04)

(58) Field of Classification Search
CPC . C08G 59/066; C08G 59/1438; C08G 59/504; C08G 2650/50; C09D 163/00; C08K 2003/3009; Y10T 428/30; Y10T 428/31511; Y10T 428/31529
USPC ........ 428/421, 408, 413, 418; 427/299, 386, 427/512; 523/400; 525/533
See application file for complete search history.

(56) References Cited

PUBLICATIONS

Wohl et al. (Copolyimide Surface Modifying Agents for Particle Adhesion Mitigation, 242nd American Chemical Society National Meeting and Exposition; Aug. 28-Sep. 1, 2011; Denver, CO; United States).*

* cited by examiner

*Primary Examiner* — Ling Choi
*Assistant Examiner* — Chun-Cheng Wang
(74) *Attorney, Agent, or Firm* — Jennifer L. Riley

(57) ABSTRACT

Epoxy resin compositions prepared using amino terminated fluoro alkyl ethers. The epoxy resin compositions exhibit low surface adhesion properties making them useful as coatings, paints, moldings, adhesives, and fiber reinforced composites.

20 Claims, 1 Drawing Sheet

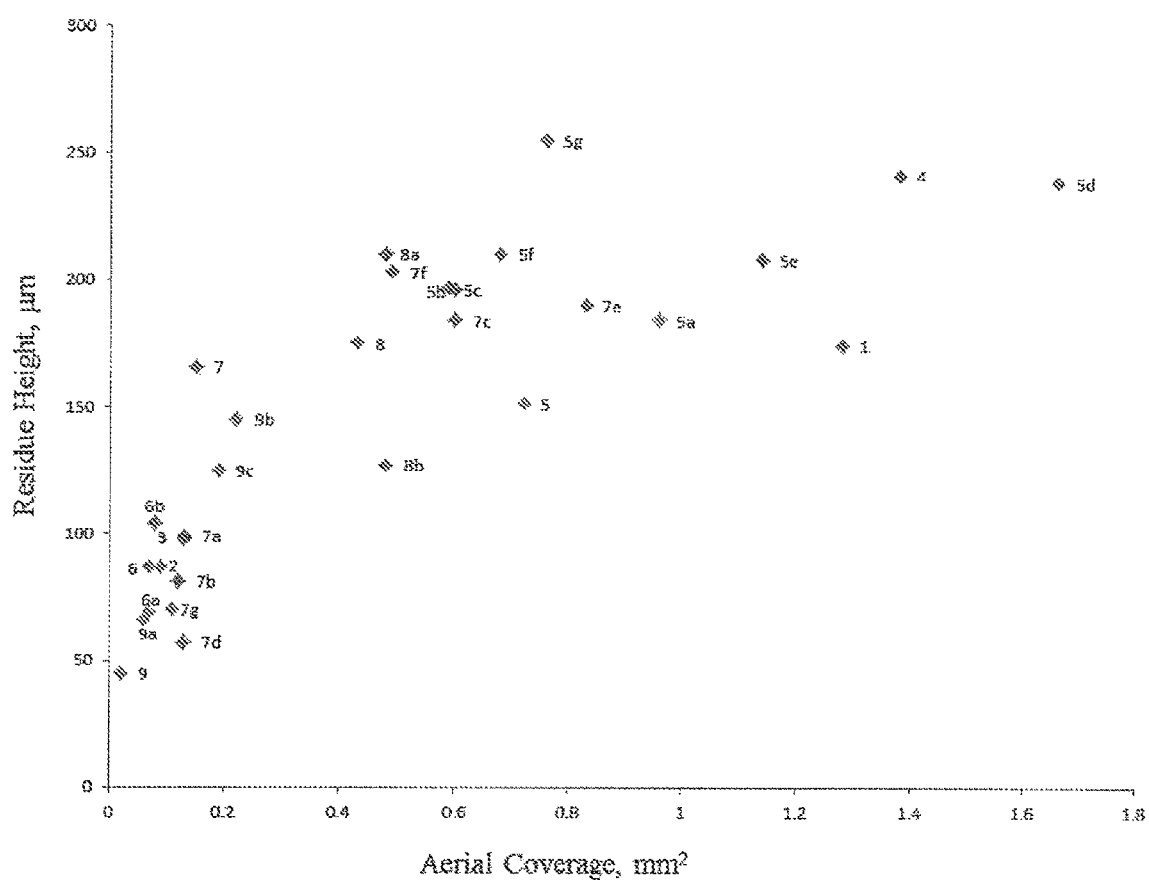

FLUORINATED ALKYL ETHER EPOXY RESIN COMPOSITIONS AND APPLICATIONS THEREOF

CROSS-REFERENCE TO RELATED APPLICATIONS

This patent application claims the benefit of and priority to 61/868,267, filed on Aug. 21, 2013 and 61/984,528, filed on Apr. 25, 2014, the contents of each of the foregoing applications is hereby incorporated by reference in its entirety.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

FIELD OF THE INVENTION

The present invention generally relates to epoxy resin compositions prepared using fluorinated alkyl ether oligomers or polymers terminated with amino groups and their applications as low surface energy paints, films, coatings, moldings, fiber reinforced composites, foams, adhesives, and the like.

BACKGROUND OF THE INVENTION

It has long been known that a wide range of surfaces on aircraft, automobiles, ship hulls, oil drilling rigs, water intakes in power plants, and the like could benefit from engineered coatings that minimize drag and adhesion of a variety of substances such as insect residue, dirt, ice, bioorganisms, deposits such as mineral deposits, etc. For example, future designs of aircraft want to take advantage of laminar flow to improve fuel efficiency. Studies have shown that for long haul flights, increases in fuel efficiency as high as 12% are possible with hybrid laminar flow control and natural laminar flow (Kirchner, M. E. NASA CP-2487, 1987, Part 1, pp. 24-44). In order to maintain laminar flow operationally, however, the aerodynamic surfaces must be relatively smooth and not allow accumulation of any substances that can interrupt laminar flow, such as insect residue or ice. In particular, a number of approaches have been attempted to reduce insect residue adhesion to aircraft surfaces such as, mechanical scrapers, sacrificial coatings or covers, and continual wetting of the surfaces during take-off and landing. All of these suffer from problems such as adding significant weight, complexity or were simply impractical in the industry (Coleman, W. S. "Boundary Layer and Flow Control", ed. G. V. Lachman, Pergamon Press, 1961, pp. 682-747. Lachman, G. V. Ministry of Aviation Aeronautical Research Council, A.R.C. Technical Report, 1960, C.P. No. 484). Passive strategies for minimizing fouling or contamination of surfaces are beneficial especially in environments where active mitigation of the fouling or contamination is impractical or impossible. One approach with promise has been the use of coatings, however, no coatings developed to date have been able to satisfy all of the requirements needed for laminar flow maintenance. Such an approach could involve modification of a material's surface energy either chemically or topographically or by using combinations thereof.

Any surface material needs to meet the requirements of its application. High performance polymeric materials have been developed to address various requirements for mechanical, thermal, and optical properties. Modification of the chemical constituency of these polymeric materials can alter their properties. Often there is a trade-off, for example, increasing the stiffness or modulus of a polymeric material typically comes with a sacrifice in toughness. Thus, modification of high performance polymeric materials is often hampered due to degradation of the desired characteristic properties. Modifying a polymeric material to change properties of the surface is problematic as addition of sufficient modifier to the bulk chemical composition to achieve the desired surface modification could also result in the diminution of important properties of the polymeric material. If the modifier is well dispersed within the polymer matrix, a majority of the modifier will be contained within the interior of the polymeric structure and will not contribute to modification of the polymer or coating surface. This is of greater consequence if the modifier is expensive, provides no advantage, or diminishes bulk properties. Polymeric materials with low adhesion surface properties have been demonstrated to be effective in a wide variety of applications.

Low surface energy polymeric materials, i.e., those exhibiting a high water contact angle, have been used to reduce biofouling, water and ice adhesion, and biofilm formation; to improve oxidation, corrosion and stain resistance; to minimize dust adhesion; and to modify the performance of microfluidic systems and biomedical devices. The ability to selectively modify the surface energy of high performance polymeric materials without sacrificing their superior mechanical, thermal, or optical properties would be of significant utility.

A number of approaches have been suggested to provide polymeric materials with low surface energy. Some of the most well-known polymeric materials having low surface energy are fluorinated, aliphatic polymers such as those available under the trade name TEFLON®. The presence of both aliphatic carbon species and fluorine atoms contributes to the low surface energy of this class of materials. These polymeric materials have an approximate homogeneous composition. These polymeric materials do not use a controlled modification and thus cannot be readily tailored for the introduction of further surface features. Moreover, they are difficult to adhere to substrates, and generally the polymer is available only as a powder and must be sintered or melted to coat the desired surface. With these difficulties in coating surfaces, delamination can become an issue during use. Another approach is to vapor deposit highly fluorinated carbonaceous materials to various substrates.

Another approach to provide low surface energy polymeric materials is to incorporate surface modifying agents into the materials. These surface modifying agents are thermodynamically driven to the surface of the polymeric material due to more favorable interactions at the air interface as compared with interactions within the bulk polymeric matrix.

Fluorine-containing oxetane derivatives have been used extensively as surface modification agents for modification of urethanes. See, for instance, Malik, et al., United States patent application publication No. US 2004/0087759. Omnova Solutions Inc. offers a family of hydroxyl terminated oxetane-derived oligomers under the trade name POLYFOX® fluorochemicals.

Epoxy is a term used for both the basic component and the cured end product of epoxy resins, as well as a generic name for the epoxide functional group. Epoxy resins, also known as polyepoxides, are a class of reactive monomers, prepolymers and polymers which contain epoxide groups. Epoxy resins may be reacted (cross-linked) either with themselves through catalytic homopolymerization, or with a wide range of co-reactants including polyfunctional amines, acids, anhydrides, phenols, alcohols, and thiols. These co-reactants are often referred to as hardeners or curatives, and the cross-linking reaction is commonly referred to as curing. Reaction of polyepoxides with themselves or with polyfunctional hardeners forms a thermosetting polymer, often with high mechanical properties and temperature and chemical resistance. The range of chemistry and property combinations in epoxies is extensive, consequently a diverse array of epoxy formulations are available. Thus they have a wide range of applications such as coatings and paints, fiber-reinforced composites, and functional and structural adhesives.

Epoxy resins are among the most important industrial polymers in the world and are used in large quantities in the production of adhesives, paints and coatings, and matrix resins. The core substrate in the production of epoxy resins may include 2,2-bis(4-hydroxyphenyl)isopropylidiene (bisphenol A). The main monomer used in the epoxy resin industry is the diglycidyl ether of bisphenol A, 2,2-Bis(4-glycidyloxyphenyl)propane (DGEBA), which represents more than 75% of the resin used in industrial applications. 2,2-Bis(4-glycidyloxyphenyl)propane is usually prepared from 2,2-Bis(4-hydroxyphenyl)isopropylidiene (bisphenol A) and epichlorohydrin using a strong base such as sodium hydroxide ether. DGEBA resins normally contain some distribution of molecular weight and exhibit a viscosity in the range of 5-15 Pascal-second at 25° C. Alternative synthetic methods to prepare DGEBA have been developed such as allylating bisphenol A followed by epoxidization.

Another common epoxy is N,N,N',N'-tetraglycidyl-4,4'-methylenedianiline (TGMDA) prepared from 4,4'-methylenedianiline and epichlorohydrin using a strong base. TGMDA epoxies are characterized by high cross-link densities, which results in a high modulus of elasticity and a high glass transition temperature. Aerospace structural epoxy matrix resins are typically based on TGMDA.

Accordingly, a desire exists to provide a polymeric material that has the mechanical, thermal, chemical, and optical properties associated with epoxies yet achieve a low energy surface.

SUMMARY OF THE INVENTION

In view of the above discussion, there is a need for epoxy compositions that can provide the desirable bulk mechanical properties of conventional coatings, adhesives or structural matrix resins while simultaneously exhibiting surface properties that minimize or mitigate surface fouling. Therefore, epoxy compositions to satisfy this need are disclosed in the instant invention.

In accordance with this invention, compositions comprising fluorinated alkyl ether epoxy resins are provided that can possess the mechanical, thermal, chemical, and/or optical properties associated with epoxies yet achieve a low energy surface (e.g., about 25 mN/m or less). By this invention, fluorinated alkyl ether epoxy resins are prepared using a minor amount of amino terminated perfluorinated alkyl ether polymer or oligomer (ATPAE). The amino end groups of the ATPAE can react with the epoxide groups and the fluorine-containing segments of the ATPAE are available to migrate to the exterior surface of the epoxy resin during cure such that low surface energies are exhibited.

Unique epoxy compositions were prepared from the ATPAEs that had unexpected combination of bulk and surface properties making them useful in aircraft coating, paint, adhesive, and composite formulations.

It is an object of the present invention to provide fluorinated alkyl ether modified epoxy compositions.

It is an object of the present invention to provide a synthetic method for the preparation of fluorinated alkyl modified ether epoxy compositions.

It is an object of this invention to provide coating, paint, adhesive and matrix resin compositions comprised of the fluorinated alkyl ether epoxy compositions.

It is an object of this invention to provide coating, paint, adhesive and matrix resin compositions comprised of the fluorinated alkyl ether epoxy compositions that exhibit good adhesion to a variety of substrates while simultaneously minimizing adhesion to the air surface of a variety of biological agents, organic and inorganic contaminants, and surface particle contamination. The fluorinated alky ether moieties may migrate to the surface resulting in a polymer matrix that is chemically anisotropic relative to the thickness direction.

According to one embodiment, the present invention provides a composition including at least one epoxy resin, at least one fluorinated alkyl ether, and, optionally, at least one curing agent.

Suitable epoxy resin may include resins containing at least one glycidyl group, alicyclic epoxy group, or a similar epoxy group (i.e., oxirane or ethoxyline group). In certain embodiments, the epoxy resin may have two or more epoxy groups. Such epoxy resins are well known in the art and include, but are not limited to, novolac-type epoxy resin, cresol-novolac epoxy resin, triphenolalkane-type epoxy resin, aralkyl-type epoxy resin, aralkyl-type epoxy resin having a biphenyl skeleton, biphenyl-type epoxy resin, dicyclopentadiene-type epoxy resin, heterocyclic-type epoxy resin, epoxy resin containing a naphthalene ring, a bisphenol-A type epoxy compound, a bisphenol-F type epoxy compound, stilbene-type epoxy resin, trimethylolpropane type epoxy resin, terpene-modified epoxy resin, linear aliphatic epoxy resin obtained by oxidizing olefin bonds with peracetic acid or a similar peracid, alicyclic epoxy resin, sulfur-containing epoxy resin, and any combination of the foregoing. In some embodiments, the epoxy resin may be composed of two or more epoxy resins of any of the aforementioned types. In particular embodiments, the epoxy resins may be aralkyl-type epoxy resins, such as epoxy resins derived from bisphenol A or 4,4'-methylenedianiline (MDA). The epoxy may also contain one or more additional components such as, for example, a benzoxazine compound or resin, and in some embodiments, the fluorinated alkyl ether diamino terminated oligomers or polymers may be used as modifiers, chain extenders or crosslinkers for epoxy resins, or epoxy hardeners in epoxy resin polymer compositions.

In the way of an overview, the fluorinated alkyl ethers include those containing divalent radicals of a polymer or oligomer derived from a fluorine-containing oxetane, preferably derived from oxetanes containing a perfluorinated carbon on a substituent on the beta carbon of the oxetane.

The ATPAEs utilized in the invention can be represented by formula (I):

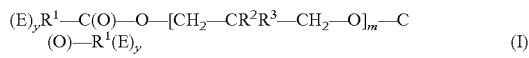

(I)

wherein:

E is predominately —NH$_2$, y is 1,

R$^1$ is aliphatic or aromatic hydrocarbon moiety of 1 to 10 carbon atoms, preferably R$^1$ is a divalent phenyl group;

R$^2$ is —H, —F, or alkyl of 1 to 6 carbon atoms, and preferably is alkyl of 1 to 3 carbon atoms, and most often methyl;

R$^3$ is —F, —R$^4$H$_{(n-a)}$F$_a$, —R$^5$—O—R$^4$H$_{(n-a)}$F$_a$, and —O—R$_4$H$_{(n-a)}$F$_a$, wherein R$^4$ is an alkyl or ether moiety of 1 to 30 carbons, R$^5$ is an alkyl moiety of 1 to 30 carbons, a is an integer of 3 to n, and n is twice the number of carbon atoms in the alkyl moiety plus 1; and m is between 4 to 500, preferably between about 6 and 100.

Preferably, the omega carbon of R$^4$ has three fluoride substituents. Preferably, R$^5$ is —CH$_2$—O—C(X)$_2$—CF$_3$, wherein X is —H or —F.

Preferred oligomers are represented by formula (II):

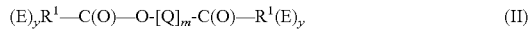

(II)

wherein:

E is predominately —NH$_2$, y is 1,

R$^1$ is aliphatic or aromatic hydrocarbon moiety of 1 to 10 carbon atoms, and preferably is alkyl of 1 to 3 carbon atoms, and most often methyl;

Q is derived from the oligomerization of an oxetane monomer wherein at least 40 mole percent of the oxetane monomer is substituted at the beta carbon with at least one substituent containing at least one perfluorinated carbon atom; and m is between 4 to 500, preferably between about 6 and 100.

The substituted oxetane monomer from which Q is derived can be represented by formula (III):

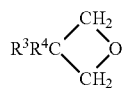

(III)

wherein:

R$^3$ is —F, —R$^4$H$_{(n-a)}$F$_a$, —R$^5$—O—R$^4$H$_{(n-a)}$F$_a$, and —O—R$^4$H$_{(n-a)}$F$_a$, wherein R$^4$ is an alkyl or ether moiety of 1 to 30 carbons, and preferably is alkyl of 1 to 3 carbon atoms, and most often methyl, R$^5$ is an alkyl moiety of 1 to 30 carbons, a is an integer of 3 to n, and n is twice the number of carbon atoms in the alkyl moiety plus 1.

In some embodiments, the compositions may contain an epoxy, an amino terminated fluorinated alkyl ether oligomer or polymer, and a curing agent. Suitable curing agents may be any monomers, oligomers, copolymers and/or co-oligomers that contain one or more functional groups that react with the epoxide ring system. These functional groups may include but are not limited to amines, phenols, anhydrides, thiols, alcohols, organic carboxylic acids and salts, acyl chlorides, aldehydes, ketones, Grignard reagents, water, sodium hydroxide, inorganic acids and their salts, or any combination thereof. The groups may be present in a terminal, pendant, or backbone configuration or any combination thereof.

There are no particular restrictions on the hardener or curing agent. Specific examples of hardeners that can be used include 4,4'-methylenedianiline (MDA), various isomers of diaminodiphenylsulfone (DDS), various isomers of diaminodiphenylether (DDE), imidazole, hexamethylenediamine, polyamidoamine, dicyan diamide, phenol novolak, and any combinations thereof. In particular, from the standpoint of reaction stability, amine-based hardeners and phenol-based hardeners are preferred, with amine-based hardeners being particularly preferred. In some cases, it is preferable to use an imidazole that will serve as the epoxy resin polymerization catalyst in conjunction with a hardener. A curing accelerator may be used in conjunction as necessary with these hardeners.

In some embodiments, the epoxy compositions may further include additional components such as, but not limited to, fillers (e.g., silica, molybdenum disulfide, iron oxide, inorganic oxides), chopped or continuous fibers, metal fibers, aramid fibers, carbon fibers, ceramic fibers, surfactants, organic binders, polymeric binders, crosslinking agents, diluents, coupling agents, thermal stability agents such as boron nitride, boron nitride nanosheets, nanoribbons, and nanomeshes, boron nitride nanotubes, flame retardant agents such as phosphates, phosphinates and phosphonates, and oligomers or polymers thereof, anti-dripping agents such as fluorinated polyolefins, silicones, and lubricants, mold release agents such as pentaerythritol tetrastearate, nucleating agents, anti-static agents such as conductive blacks, carbon nanotubes, graphite, graphene, oxidized graphene, and organic antistatics such as polyalkylene ethers, alkylsulfonates, perfluorosulfonic acid, perfluorobutane sulfinic acid potassium salt, and polyamide-containing polymers, catalysts, colorants, inks, dyes, antioxidants, UV stabilizers, and the like and any combinations of the foregoing additional components. In some embodiments, these additional components may or may not chemically react with the epoxy and become chemically incorporated into the composition.

In such embodiments, the one or more additional components or additives may make up from about 0.01 wt. % to about 50 wt. % based on the total composition. In other embodiments, additional components such as glass fiber, carbon fiber, organic fiber, ceramic fiber or other fillers may be provided at much higher concentrations of up to about 70 volume (vol.) %. For example, in some embodiments the novel epoxy compositions may include up to about 70 vol. % glass fiber, carbon fiber, organic fiber and/or ceramic fiber, and in other embodiments, they may include from about 5 vol. % to about 70 vol. %, from about 10 vol. % to about 60 vol. %, or about 20 vol. % to about 50 vol. % glass fiber, carbon fiber, organic fiber and/or ceramic fiber.

For example, in some embodiments, the epoxy compositions of the invention may be used as coatings on plastics, metals, glass, carbon, ceramic, or fiber reinforced composites or wood products which can be in a variety of forms, for example as a fiber, woven mat, nonwoven mat, cloth, broadgood, fabric, molding, laminate, foam, extruded shape or the like, and in other embodiments, the epoxy compositions of the invention can be used to fabricate coatings, free-standing films, fibers, foams, molded articles, adhesive formulations and fiber reinforced composites. In some embodiments, the epoxy compositions of the invention can be used to formulate paints or coatings. In some embodiments, the epoxy compositions of the invention can be used to fabricate adhesive bonds between one or more substrates.

The novel epoxy compositions of the invention, due to their unique morphology, may exhibit outstanding adhesion to a variety of substrates while simultaneously having surface properties that resist adhesion of a variety of materials that come into contact with the surface exposed to the air. In addition, the epoxy compositions comprised of the fluorinated alkyl ether oligomers and polymers exhibit good processability by a variety of techniques commonly used in the fabrication of films, coatings, foams, moldings, adhesives, and composites making these materials useful in applications, for example, in the aerospace, automotive, medical, nautical, preservation/restoration, energy harvesting, desalination, water treatment, rail and construction sectors that require low adhesion surfaces. In addition, these articles are well suited for a variety of applications that require the low energy surface properties while maintaining bulk properties consistent with those of cured functional and structural epoxy resins.

BRIEF DESCRIPTION OF DRAWING

FIG. 1 depicts a graphical representation of the results of aerial coverage on the x-axis and residue height on the y-axis presented in Table 4 and described in the Examples.

DETAILED DESCRIPTION OF THE INVENTION

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention pertains to compositions comprising fluorinated alkyl ether epoxy resins and their applications. The compositions are prepared by reacting amino terminated fluoro alkyl ether oligomers or polymers with any epoxy compound, oligomer or polymer. Other compounds, chemicals, components, materials and additives may be included in these compositions. These compositions exhibit a unique and unexpected combination of properties in that the surface properties are much different from those of the bulk resin. This unique combination of properties enables applications that require high mechanical and adhesion properties of the bulk resin, but low adhesion properties on the surface.

As used herein and in the claims, the terms "comprising" and "including" are inclusive or open-ended and do not exclude additional unrecited elements, compositional components, or method steps. Accordingly, the terms "comprising" and "including" encompass the more restrictive terms "consisting essentially of" and "consisting of." Unless specified otherwise, all values provided herein include up to and including the endpoints given, and the values of the constituents or components of the compositions are expressed in weight percent or % by weight of each ingredient in the composition.

According to one embodiment, the present invention includes an epoxy composition comprising one or more epoxy resins, one or more fluorinated alkyl ethers, optionally, one or more curing agents, and, optionally, one or more additional components. The epoxy composition may include a reaction product of the one or more epoxy resins and the one or more amino terminated fluorinated alkyl ether oligomers or polymers.

Epoxy Resin(s)

Any epoxy resin can be used for the purpose(s) of the invention provided that the resin contains at least one glycidyl group, alicyclic epoxy group, and/or a similar epoxy group (e.g., oxirane or ethoxyline group). Such epoxy resins are well known in the art and include, but are not limited to, novolac-type epoxy resin, cresol-novolac epoxy resin, triphenolalkane-type epoxy resin, aralkyl-type epoxy resin, aralkyl-type epoxy resin having a biphenyl skeleton, biphenyl-type epoxy resin, dicyclopentadiene-type epoxy resin, heterocyclic-type epoxy resin, epoxy resin containing a naphthalene ring, a bisphenol-A type epoxy compound, a bisphenol-F type epoxy compound, stilbene-type epoxy resin, trimethylol-propane type epoxy resin, terpene-modified epoxy resin, linear aliphatic epoxy resin obtained by oxidizing olefin bonds with peracetic acid or a similar peracid, alicyclic epoxy resin, sulfur-containing epoxy resin, and any combinations of one or more of the foregoing.

In some embodiments, the epoxy resin may have two or more epoxy groups. In other embodiments, the epoxy resin is a di-functional epoxy resin including two or more epoxy groups. In still further embodiments, the epoxy resin may be composed of two or more epoxy resins of any of the aforementioned types. In particular embodiments, the epoxy resins may include aralkyl-type epoxy resins, such as epoxy resins derived from bisphenol A and/or 4,4'-methylenedianiline (e.g., a reaction product of epichlorohydrin and bisphenol A). In some embodiments, the epoxy resin comprises 2,2-bis(4-hydroxyphenyl)isopropylidiene (bisphenol A).

The epoxide equivalent weight (g/eq) of the epoxy resin may range from about 100 to about 1000, about 100 to about 500, about 100 to about 300, or about 100 to about 200. Epoxide equivalent weight refers to the number average molecular weight of the epoxide moiety in grams per equivalent (g/eq) divided by the average number of epoxide groups present in the molecule. Preferably, the epoxide equivalent weight ranges from about 180 to about 200, or about 182 to about 192. The epoxide percentage of the epoxy resin may range from about 5% to about 50%, about 10% to about 30%, about 20% to about 25%, about 22% to about 24%, or about 22.4% to about 23.6%.

The epoxy may also contain one or more additional components such as, for example, a benzoxazine compound or resin and in some embodiments, the novel fluorinated alkyl ether diamino terminated oligomers or polymers may be used as modifiers, chain extenders or crosslinkers for epoxy resins, or epoxy hardeners in epoxy resin polymer compositions. Preferred epoxies are those derived from 2,2-bis(4-hydroxyphenyl)isopropylidiene (bisphenol A) and 4,4'-methylenedianiline (MDA), e.g., DGEBA and TGMDA.

The epoxy resin may be of any suitable form and may be curable under any suitable conditions. Preferably, the epoxy resin is a liquid epoxy resin and may be effectively cured at ambient temperatures with a wide variety of curing agents.

Fluorinated Alkyl Ether(s)

The fluorinated alkyl ethers of this invention are characterized as containing divalent radicals of a polymer or oligomer derived from a fluorine-containing oxetane, preferably oxetanes containing a perfluorinated carbon on a substituent on the beta carbon of the oxetane. The amine-terminated alkyl ethers contain at least one fluorinated pendant group with a degree of fluorination ranging from a single trifluoromethyl functionality up to a perfluorinated butane moiety. The fluorinated pendant group generally refers to any substituent that includes at least one fluorine atom. The fluorinated pendant group preferably includes fluorinated alkyl groups.

The ATPAEs utilized in the invention can be represented by the formula (I):

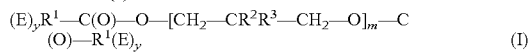
(I)

wherein:

E is predominately —$NH_2$, meaning the moiety is an amine mostly comprised of —$NH_2$, but which optionally contains a minor amount of another moiety, y is 1, $R^1$ is aliphatic or aromatic hydrocarbon moiety of 1 to 10 carbon atoms, preferably $R^1$ is a divalent phenyl group;

$R^2$ is —H, —F, or alkyl of 1 to 6 carbon atoms, and preferably is alkyl of 1 to 3 carbon atoms, and most often methyl;

$R^3$ is —F, —$R^4H_{(n-a)}F_a$, —$R^5$—O—$R^4H_{(n-a)}F_a$, and —O—$R^4H_{(n-a)}F_a$, wherein $R^4$ is an alkyl or ether moiety of 1 to 30 carbons, $R^5$ is an alkyl moiety of 1 to 30 carbons, a is an integer of 3 to n, and n is twice the number of carbon atoms in the alkyl moiety plus 1; and m is between 4 to 500, preferably between about 6 and 100.

Preferably the omega carbon of $R^4$ has three fluoride substituents. Preferably, $R^5$ is —$CH_2$—O—$C(X)_2$—$CF_3$, wherein X is —H or —F.

Preferred oligomers are represented by the formula (II):

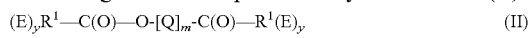
(II)

wherein:

E is predominately —$NH_2$, y is 1, $R^1$ is aliphatic or aromatic hydrocarbon moiety of 1 to 10 carbon atoms, and preferably is alkyl of 1 to 3 carbon atoms, and most often methyl;

Q is derived from the oligomerization of an oxetane monomer, wherein at least 40 mole percent of the oxetane monomer is substituted at the beta carbon with at least one substituent containing at least one perfluorinated carbon atom; and m is between 4 to 500, preferably between about 6 and 100.

The substituted oxetane monomer from which Q is derived can be represented by the formula (III):

(III)

wherein:

$R^3$ is —F, —$R^4H_{(n-a)}F_a$, —$R^5$—O—$R^4H_{(n-a)}F_a$, and —O—$R^4H_{(n-a)}F_a$, wherein $R^4$ is an alkyl or ether moiety of 1 to 30 carbons, and preferably is alkyl of 1 to 3 carbon atoms, and most often methyl, $R^5$ is an alkyl moiety of 1 to 30 carbons, a is an integer of 3 to n, and n is twice the number of carbon atoms in the alkyl moiety plus 1.

In some embodiments, more than one fluorinated alkyl ether oligomer or polymer may be used to prepare the epoxy composition. Suitable fluorinated alkyl ether oligomers and polymers terminated with amino groups are described in United States Publication No. 2012/0252968.

In particular, the amino terminated fluorinated alkyl ether oligomer or polymer may include one or more compounds represented by formulas (IV), (V), (VI), and (VII):

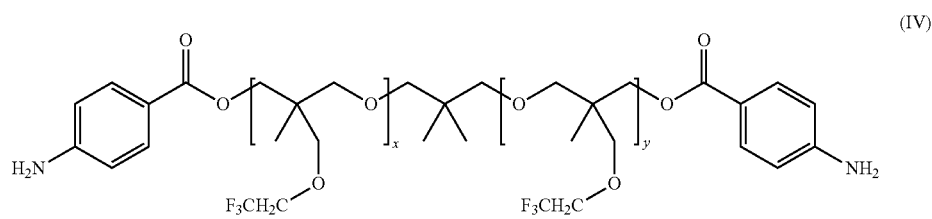
(IV)

where x+y=6 to 20.

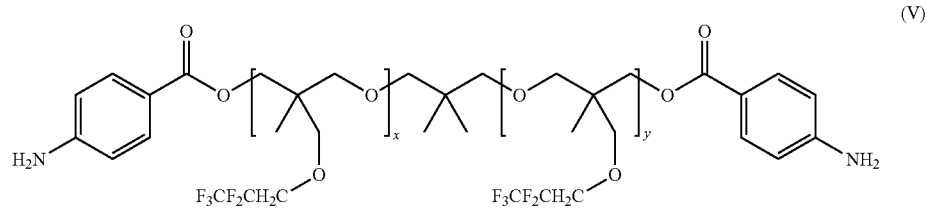
(V)

where x+y=4 to 5.

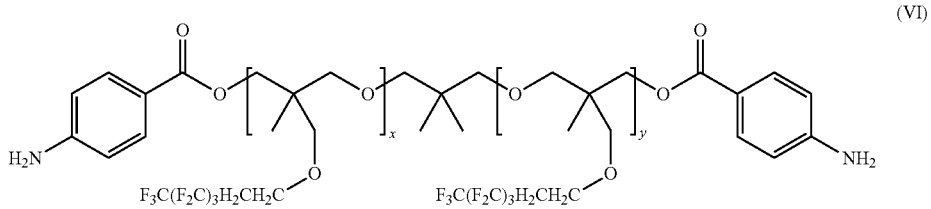

(VI)

where x+y=6.

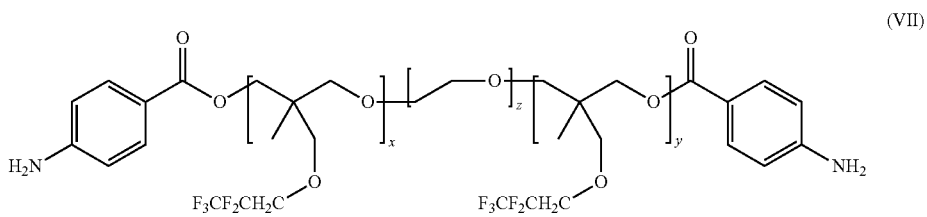

(VII)

where x+y=6 and z=33.

The amount of fluorinated alkyl ether oligomer or polymer present in the final cured epoxy composition may range from about 0.01 to 99% by weight. In particular, the amount of fluorinated alkyl ether oligomer or polymer may range from about 0.1 to 25%, about 0.1 to 10%, about 0.1 to 5%, about 0.5 to 5%, or about 1 to 5% by weight.

The fluorinated alkyl ether oligomers and polymers contain fluorocarbon moieties that enable the cured epoxy resin to achieve low surface energy with a relatively low content of the fluorinated alkyl ether oligomers and polymers.

Curing Agent(s)

In some embodiments, the compositions may contain an epoxy, an amino terminated fluorinated alkyl ether oligomer or polymer, and a curing agent. Suitable curing agents may be any monomers, oligomers, copolymers or co-oligomers that contain one or more functional groups that react with the epoxy resin.

These functional groups may include, but are not limited to, amines, phenols, anhydrides, thiols, alcohols, organic carboxylic acids and salts, acyl chlorides, aldehydes, ketones, Grignard reagents, water, sodium hydroxide, inorganic acids and their salts and any combinations thereof. The groups may be present in a terminal, pendant or backbone configuration or any combinations thereof.

There are no particular restrictions on the hardener or curing agent. Specific examples of hardeners include 4,4'-methylenedianiline (MDA), various isomers of diaminodiphenylsulfone (DDS), various isomers of diaminodiphenylether (DDE), imidazole, hexamethylenediamine, polyamidoamine, dicyan diamide, phenol novolak, and any combinations thereof. In particular, from the standpoint of reaction stability, amine-based hardeners and phenol-based hardeners are preferred, with amine-based hardeners being particularly preferred. In some cases, it is preferable to use an imidazole that will serve as the epoxy resin polymerization catalyst in conjunction with a hardener. A curing accelerator or catalyst may be used in conjunction as necessary with these hardeners. The catalyst may be latent.

A diamine curing agent may be aliphatic or aromatic and includes diamines containing other hetero atoms. One or more other diamines may be used. Examples of diamines include aliphatic diamine such as trimethylenediamine, tetramethylenediamine, pentamethylenediamine, hexamethylenediamine, 2,2,4-trimethylhexamethylenediamine, 2,4,4-trimethylhexamethylenediamine, octamethylenediamine and nonamethylenediamine; and an alicyclic diamine such as bis(4-aminocyclohexyl)methane and bis(4-amino-3-methylcyclohexyl)methane; aromatic diamine, for example, phenylenediamine, diaminotoluene, 2,4-diaminomesitylene, 3,5-diethyl-2,6-diaminotoluene, xylylenediamine (in particular, metaxylylenediamine, paraxylylenediamine), bis(2-aminoethyl)benzene, biphenylenediamine, a diamine having a biphenyl backbone (e.g., 4,4'-diamino-3,3'-ethylbiphenyl), adiamine having adiphenyl alkane backbone [e.g., diaminodiphenylmethane, bis(4-amino-3-ethylphenyl)methane, bis(4-amino-3-methylphenyl)methane, 3,3'-dichloro-4,4'-diaminodiphenylmethane, 2,2'-bis(4-aminophenyl)propane], bis(4-aminophenyl)ketone, bis(4-aminophenyl)sulfone, or 1,4-naphthalenediamine, and an N-substituted aromatic diamine thereof; alicyclic diamine, such as 1,3-cyclopentanediamine, 1,4-cyclohexanediamine, and bis(4-amino-3-methylcyclohexyl)methane; an aliphatic amine, such as trimethylenediamine, tetramethylenediamine, pentamethylenediamine, hexamethylenediamine, 2,2,4-trimethylhexamethylenediamine, 2,4,4-trimethylhexamethylenediamine, and octamethylenediamine, and an N-substituted aliphatic diamine thereof; and ether diamines, such as poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide) terminated poly(ethylene ether)diamine, 4,4'-oxydianaline; and aminated random or block copolymers of tetrahydrofuran with minor amounts of a second monomer such as ethylene oxide, propylene oxide, methyl tetrahydrofuran, bis[4-(3-aminophenoxyl)phenyl]methane, bis[4-(4-aminophenoxyl)phenyl]methane, 1,1-bis[4-(3-aminophenoxyl)phenyl]ethane, 1,1-bis[4-(4-aminophenoxyl)phenyl]ethane, 1,2-bis[4-(3-aminophenoxyl)phenyl]ethane, 1,2-bis[4-(4-aminophenoxyl)phenyl]ethane, 2,2-bis[4-(3-aminophenoxyl)phenyl]propane, 2,2-bis[4-(4-aminophenoxyl)phenyl]propane, 2,2-bis[4-(3-aminophenoxyl)phenyl]butane, 2,2-bis[4-(4-aminophenoxyl)phenyl]butane, 2,2-bis[4-(3- aminophenoxyl)phenyl]-1,1,1,3,3,3-hexafluoropropane, 2,2-bis[4-(4-aminophenoxyl)phenyl]-1,1,1,3,3,3-hexafluoropropane, 4,4'-bis(3-aminophenoxy)biphenyl, 4,4'-bis(4-aminophenoxy)biphenyl, bis[4-(3-aminophenoxyl)phenyl]ketone, bis[4-(4-aminophenoxyl)phenyl]ketone, bis[4-(3-aminophenoxyl)phenyl]sulfide, bis[4-(4-aminophenoxyl)phenyl]sulfide, bis[4-(3-aminophenoxyl)phenyl]sulfone, bis[4-(4-aminophenoxyl)phenyl]sulfone, and any combinations thereof.

The amount of curing agent may be selected based upon the type and amount of epoxy resin selected. For example, the curing agent may be present in ratios ranging from about 1:1 to about 1:0.1, about 1:1 to about 1:0.2, about 1:1 to about 1:0.5, or about 1:1 to about 1:0.8 of epoxy to curing agent.

Additional Component(s)

In some embodiments, the epoxy compositions may further optionally include additional components such as, but not limited to, fillers (e.g., silica, molybdenum disulfide, iron oxide, inorganic oxides), chopped or continuous fibers, metal fibers, aramid fibers, carbon fibers, ceramic fibers, surfactants, organic binders, polymeric binders, crosslinking agents, diluents, coupling agents, flame retardant agents such as phosphates, phosphinates, phosphonates, and oligomers or polymers thereof, anti-dripping agents such as fluorinated polyolefins, silicones, and, lubricants, mold release agents such as pentaerythritol tetrastearate, nucleating agents, anti-static agents such as conductive blacks, carbon nanotubes, graphite, graphene, oxidized graphene, and organic antistatics, such as polyalkylene ethers, alkylsulfonates, perfluorosulfonic acid, perfluorobutane sulfinic acid potassium salt, and polyamide-containing polymers, catalysts, colorants, inks, dyes, antioxidants, UV stabilizers, and the like and any combinations of the foregoing additional components.

In the instance when fillers are present, the fillers may range in size from nanometers (nm) to micrometers (mm), for example, about 1 nm to about 10 mm. In particular, the filler particles may range from about 1 to about 500 nm, about 5 to about 100 nm, or about 7 to about 40 nm in size. The fillers may also be of any suitable shape, e.g., spherical, cylindrical, platelet, and/or amorphous.

These additional components may be present to improve the processability or manufacturability of the composition, enhance composition aesthetics, and/or improve a particular functional property or characteristic of the coating composition or the resultant cured compositions, such as adhesion to a substrate or adjacent composition. Each optional ingredient can be included in a sufficient amount to serve its intended purpose, but preferably not in such an amount to adversely affect a coating composition or a cured coating resulting therefrom.

In some embodiments, the one or more additional components or additives may make up from about 0.01 wt. % to about 50 wt. % based on the total composition. In particular, when fillers, such as silica, molybdenum disulfide, iron oxide, inorganic oxides, and mixtures thereof, are used, the filler may be present in an amount of about 1 to about 40 wt. %, about 5 to about 40 wt. %, about 5 to about 30 wt. %, about 5 to about 20 wt. %, or about 5 to about 10 wt. % based on the total weight of the composition. In other embodiments, additional components such as glass fiber, carbon fiber, organic fiber, ceramic fiber and/or other fillers may be provided at much higher concentrations up to about 70 volume (vol.) %. For example, in some embodiments the novel epoxy compositions may include up to about 70 vol. % glass fiber, carbon fiber, organic fiber and/or ceramic fiber, and in other embodiments, they may include from about 5 vol. % to about 70 vol. %, about 10 vol. % to about 60 vol. %, or about 20 vol. % to about 50 vol. % glass fiber, carbon fiber, organic fiber and/or ceramic fiber.

Process of Making

The epoxy copolymeric composition may be generated by mixing together the one or more epoxy resins with the one or more amino terminated fluoro alkyl ether compounds and other optional components. For example, the epoxy compositions may be prepared by simply admixing the ingredients in any desired order with sufficient mixing. The resulting mixture may be admixed until all the composition ingredients are substantially homogeneously blended. Mixing equipment can be operated in batch, semi-batch, or continuous mode. Examples of mixers include rotor-stator, microfluidizer, high pressure homogenizer, ultrasonic, impinging jet, Cowles™ blade, planetary mixers, and melt kneading devices such as extruders.

The epoxy compositions may be prepared by reacting the amino terminated fluoro alkyl ether oligomers or polymers with any epoxy compound, oligomer, and/or polymer containing at least one glycidyl group, alicyclic epoxy group, oxirane group, or ethoxyline group. The epoxy composition may comprise the reaction product of the epoxy resin with the amino terminated fluorinated alkyl ether oligomer or polymer where the amine reacts with the epoxy resin and the fluorinated pendant group migrates to the surface of the epoxy composition to provide for low surface energies (e.g., about 25 mN/m or less). The epoxy resin and amino terminated fluoro alkyl ether may be reacted under any suitable conditions known in the art.

If prepared for use as a coating, the epoxy compositions may be prepared and applied as a solvent-free powder coating, as a substantially solvent-free hot melt coating, as a substantially solvent-free liquid admixture, or the resins may be reduced in viscosity by dilution with one or more solvents and applied as a liquid admixture. By way of example, the at least one epoxy resin, the at least one amino terminated fluorinated alkyl ether oligomer or polymer, optionally, at least one curing agent; and optionally, additional components (e.g., fillers) may be dissolved in a solvent under agitation. Suitable solvents may include ketone containing solvents, such acetone, MEK (methyl ethyl ketone), cyclohexanone, DEK (diethyl ketone), MPK (methyl propyl ketone), MIBK (methyl iso-butyl ketone), MAK (methyl amyl ketone), and the like. Preferably, the solvent includes at least methyl ethyl ketone. In some embodiments, the solvent is methyl ethyl ketone. If present, the filler content of the solids component of the solution (e.g., for spraying) may range from about 5 to about 66 wt. % based on the total weight of the solution.

The dissolved composition may be coated on a substrate. The substrate may include any suitable substrate, such as glass, ceramic, metal and alloys, polymers, carbon allotropes, inorganic oxides, and adhesive-backed materials. In some embodiments, the substrate is aluminum. In some embodiments, the substrate is an adhesive-backed material. The coating can be applied to the substrate using any suitable procedure such as spray coating, roll coating, coil coating, curtain coating, immersion coating, meniscus coating, kiss coating, blade coating, knife coating, dip coating, slot coating, slide coating, brushing, casting, spin coating, injection molding, and the like, as well as other types of pre-metered coating. Preferably, the coating is applied via spray coating.

After applying the coating composition onto the substrate, the composition can be cured using a variety of processes, including, for example, oven baking by either conventional or unconventional methods. In preferred embodiments, the epoxy composition is a thermal-cure coating composition. The curing process may be performed in either discrete or combined steps. The curing process may be performed thermally, as a result of UV-light exposure, may occur under ambient conditions, or may be any combination of these conditions. For example, the coated substrate can be dried at ambient temperature or under forced air to evaporate the residual solvent and/or leave the coating composition in a largely un-crosslinked or partially crosslinked state. The coated substrate can then be heated to fully cure the coating composition. In certain instances, the coating composition can be dried and cured in one step. In preferred embodiments, the epoxy composition is a heat-curable coating composition. For example, the coated substrate may be allowed to air dry, and subsequently, the coated substrate may be thermally curing under heating (e.g., about 100 to 175° C. for about 2 to about 6 hours).

Properties and Applications

The epoxy-based systems were modified with the amine-terminated moieties to act as surface modifying agents, which migrate to the surface. When used as coatings, these coatings exhibit extreme water contact angles enabling super-hydrophobic surfaces. Water droplets placed on the surface readily slide off with tilt angles as low as a few degrees relative to horizontal. Several reasons for this include the fact that the fluorinated alky ether moieties will migrate to the surface resulting in a polymer matrix that is chemically anisotropic relative to the thickness direction of the coating. The coatings may also be transparent (i.e., not opaque), clear, or having no color. The particular fillers, when present, also provide topographical modifications to the surface resulting in increased roughness that enable entrapment of air generating a Cassie-Baxter wetting state which may be requisite for generation of a super-hydrophobic surface.

The surface energy may be quantified by measuring the hydrophobic characteristic of the surface by analyzing the contact angle of a drop of water, ethylene glycol, or diiodomethane, for example, on the surface. The shape of the water drop and the angle between the surface and the tangent of the water drop is called the contact angle and is related to the surface energy. In general, the greater the contact angle the lower the surface energy. The epoxy resin compositions of the present invention may exhibit a water contact angle greater than about 100, for example, ranging from about 100 to about 150, about 120 to about 150, or about 140 to about 150. The epoxy resin compositions may exhibit low surface energies of about 25 mN/m or less, for example, ranging from about 0.1 to about 25 mN/m, about 0.1 to about 20 mN/m, about 0.5 to about 15 mN/m, or about 0.5 to about 5 mN/m.

Due to the improved properties of the epoxy resin composition, coated substrates, for example, may be readily cleaned of any and all residual contaminations. For example, coated surfaces impacted with fruit flies may have enhanced cleanability such that the adhered insect residue may be readily removed with water and a dampened cloth (e.g., a cheesecloth) with minimal effort.

In some embodiments, the epoxy compositions of the invention may be used, for example, as coatings on plastics, metals, glass, carbon, ceramic, adhesive formulations or in fiber reinforced composites or wood products which can be in a variety of forms, such as a fiber, woven mat, nonwoven mat, cloth, broadgood, fabric, molding, laminate, foam, extruded shape and the like. In other embodiments, the epoxy compositions of the invention can be used to fabricate coatings, free-standing films, fibers, foams, molded articles, adhesive formulations, and fiber reinforced composites. Since the materials described herein are hydrophobic, they can also provide corrosion protection to a variety of surfaces that undergo electrochemical corrosion upon the ingress of water.

Due to the properties that the materials of the instant invention possess, they can be used in the various forms mentioned above for applications, such as, but not limited to; aircraft and aerospace vehicle (launch vehicles, helicopters, unmanned aerial vehicles, etc.) surfaces to prevent adhesion of a variety of materials such as insect reside, ice, dirt and dust and other deposits, ship hulls, ship surfaces, barge surfaces, oil rig surfaces, pipes, valves and pumps (interior and exterior), electrical transmission wires and cables, filters, filtration components, electronic components, printed circuit boards (PCB)s, controlled fluid flow devices, medical implants, automobile, truck, motorcycle and boat surfaces, racing vehicle surfaces, infrastructural surfaces such as roads, bridges, building exteriors and interiors, stairs, railings, firefighting clothing and equipment, tactical, rescue and emergency response clothing, protective gear and equipment, windpower (windmill) blades and wind turbine systems, and exposed surfaces.

Construction material applications such as coatings on wood, cement, concrete and other masonry forms to prevent or minimize water penetration, paper and fabric moisture barrier coatings for paper and cardboard products such as insulation, "tar" paper (usually placed underneath roofing shingles), cardboard molds for concrete, coatings on glass or ceramics for self-cleaning applications, structural and functional composites such as carbon ceramic or glass fiber reinforced composites used in the construction of automobiles, aircraft, boats, space vehicles, launch vehicles, construction products (such as shingles) in which the composite can, for example, provide structural mechanical properties and at the same time have a low adhesion surface or moisture resistant surface.

The materials of the instant invention may be applied to a variety of substrates such as but not limited to various types of glasses, ceramics, metals, metal alloys, polymers, carbon allotropes, and inorganic oxides. Composites consisting of various combinations of chopped or continuous carbon, glass, inorganic, or organic fibers with an organic, metallic, metal oxide, organometallic, carbon or ceramic matrix. These substrates can be in a variety of forms, such as, but not limited to, flat, curved, concave, convex, or a variety of contours or combinations thereof. The substrates may be monolithic or combined in a multitude of ways including stacked, layered, or randomly intermixed. The substrates may be in the form of solid pieces, chopped or continuous fibers, woven mats or products, nonwoven mats or products, particulates of various dimensions, molded articles of complex shapes or architectures.

The various substrates may be pretreated to change the surface properties (surface energy), for example using, but not limited to, abrasive, mechanical, energetic radiation (laser, plasma electron beam, ultraviolet), chemical or electrochemical processes. Specific pretreatment of the substrate is substrate dependent. For example, with metals and metal alloys it may be desirable to pretreat the metal to remove any oils or grease remaining from a machining process or to create specific surface chemistries. For example with titanium 6Al-4V alloy, this often involves an acid etch to create a fresh oxide surface followed by a priming agent to preserve that surface. The surface pretreatment may include a solvent-containing or solvent-free chemical pretreatment. Other common pretreatments include sand or grit blasting, use of a coupling agent, use of a sizing agent, acid or base exposure, use of various types of lasers and plasmas, electron beams, ultraviolet exposures and other high energy type treatments or any combinations thereof. In some cases, these pretreatments may introduce random or patterned topographical features either intentionally or unintentionally. The topographical features can extend from a few nanometers to many micrometers in height and may, in some cases, be hierarchical in design (i.e. they have topography that covers the entire range of nanometer to micrometer in which the nanometer features are present on the surface of the micrometer features). The pretreatment is preferably applied to the substrate before spray coating the dissolved composition on the substrate to promote wetting and adhesion of the spray-deposited solution.

The novel epoxy compositions of the invention, due to their unique morphology, may exhibit outstanding adhesion to a variety of substrates while simultaneously having surface properties that resist adhesion of a variety of materials that come into contact with the surface exposed to air. In addition, the epoxy compositions comprised of the fluorinated alkyl ether oligomers or polymers exhibit good process-ability by a variety of techniques commonly used in the fabrication of films, coatings, foams, moldings, adhesives and composites making these materials useful in applications, for example, in the aerospace, automotive, and construction sectors that require low adhesion surfaces. These articles are well suited for a variety of applications that require the low energy surface properties while maintaining bulk properties consistent with those of cured functional and structural epoxy resins.

EXAMPLES

Having generally described the invention, a more complete understanding thereof may be obtained by reference to the following examples that are provided for purposes of illustration only and do not limit the invention.

All samples were prepared using 100 parts of epoxy and 80 parts of curing agent equivalents weights. Fumed silica (7 nm diameter, a hydrophilic silica material) and molybdenum disulfide (MoS$_2$, <2 □m diameter) were obtained from Sigma Aldrich and used as received. AEROXIDE® LE2, a hydrophobic silicon dioxide with a Brunauer-Emmett-Teller (BET) surface area of 220 m$^2$/g, was obtained from EVONIK Industries and used as received. D.E.R. 331 (epoxy equivalent weight of 187.5) was obtained from The Dow Chemical Company and ETHACURE 100 (amine equivalent weight of 44.6) was obtained from the Albemarle Corporation and used as received. Aluminum (Al) 1100 alloy sheets approximately 76 μm in thickness were used as the epoxy formulation coating substrate. Prior to surface coating, the Al alloy substrates were cleaned with absolute ethanol using a dust-free laboratory cloth and air-dried at room temperature. Spray coating of the various epoxy formulations was performed using an airbrush (Badger Model 250) pressurized with dry air inside a paint booth. Flightless fruit flies were purchased from The Fruit Fly Shop located in San Diego, Calif. Surface energy of the coatings was characterized via contact angle goniometry using a First Ten Angstroms FTA 1000B goniometer at ambient conditions. Contact angles were measured for each sample using an 8 □L drop of either water or ethylene glycol, and a 2 □L drop of methylene iodide. For each liquid, interfacial tension measurements were made of a suspended drop prior to experimentation to verify liquid purity and precision of the focused image. Contact angles were determined by drop shape analysis. For all surfaces, contact angles were measured for a minimum of three droplets. Surface energies were determined using the regression line analysis method developed by Kaelble (Kaclble, D. H., "Dispersion-Polar Surface Tension Properties of Organic Solids," *J Adhes.*, 2, 1970, pp. 66-81).

To emulate flight conditions under which insect impact events occur, controlled fruit fly impact studies were conducted inside a benchtop wind tunnel. An insect delivery device was utilized to propel the fruit fly at velocities representative of aircraft takeoff speeds. Testing was conducted using a custom-built pneumatic insect delivery device constructed from a VACCON HIGHVAC HVP series 300-Venturi vacuum pump that was modified with an extended delivery nozzle to enable accurate positioning of the insect impact site. An impingement angle normal to the test surface was utilized. All tubing had an inner diameter (I.D.) of 1.27 cm. A 1 cm long Teflon® tube protruded from the insect insertion port. Air pressure to propel the insects was supplied through a high-pressure air hose using house air at a pressure sufficient to emulate the speed of aircraft at takeoff and landing, approximately 240 km/h. A single insect was used per impact event. Coated Al alloy foils were mounted onto a ¼ scale model of a section of an aircraft wing, located approximately 2.6 cm from the delivery nozzle. Testing was conducted at ambient temperature (approximately 25° C.) and about 50-60% relative humidity. For each event, the airflow was turned on prior to feeding the insect into the insect insertion port. The suction force rapidly ejected the insect from the delivery port for impact on the test surface. After each impact event the airflow was maintained for an additional 5 s to simulate wind shear experienced during actual flight conditions. High-speed photography was obtained during impact events using a Vision Research Phantom 12 camera at a speed of 50,000 frames per second.

Insect residue heights were characterized using a FRT of America optical surface profilometer (Microprof 100). Data were collected over the entire region containing visible insect residues at a resolution of 5 □m between data points and 40 □m line to line. Several processing steps were performed on the collected topographical data including: segmentation to remove false zero readings, fitting the baseline to a second-order polynomial, and masking any edge and surface defects. Areal coverage was determined using grain analysis that identified and summed all features above the lowest permissible data plane, typically 8-15 □m, as individual grains. The data plane threshold above the established baseline was necessary to sufficiently separate insect residue features from substrate anomalies.

Example 1

Control Epoxy with No ATPAE

A bisphenol A based epoxy (D.E.R. 331) with an epoxy equivalent weight of 187.5 was used along with an aromatic diamine curing agent (ETHACURE 100, diethyltoluenediamine, DETDA) with an amine equivalent weight of 44.6 were used to prepare control and experimental samples. In a representative method, the D.E.R. 331 (3.3687 g) and the Ethacure 100 (0.6425 g) were placed in a flask along with methyl ethyl ketone (MEK, 57 mL) and manually stirred with a glass rod. The solution was subsequently used to spray coat an aluminum (Al) substrate. The coated substrate was allowed to air dry and subsequently placed in an oven and heated to 100° C. for 2 hrs and then 175° C. and held for 4 hrs.

Example 2

Control Epoxy with Fumed Silica and No ATPAE

Epoxy samples were prepared with fumed silica at various concentrations following the process described in Example 1. The fumed silica was first weighed and dispersed in MEK, and subsequently added to the epoxy solution. This mixture was used to spray coat Al substrate followed by thermal curing as described in Example 1.

Example 3

Control Epoxy with AEROXIDE® LE2 Silica and No ATPAE

Epoxy samples were prepared with AEROXIDE® LE2 silica at various concentrations following the process described in Example 2.

Example 4

Control Epoxy with $MoS_2$ and No ATPAE

Epoxy samples were prepared with $MoS_2$ at various concentrations following the process described in Example 2.

Example 5

Epoxy Modified with ATPAE

Epoxy samples with various loading levels of ATPAEs were prepared following the procedure described in Example 1 where:

ATPAE 636 and 6320 are represented by formula (IV):

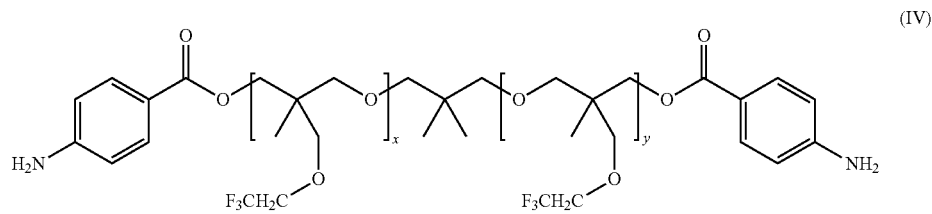

(IV)

where for ATPAE 636, x+y=6 and for ATPAE 6320, x+y=20.
ATPAE 7002 is represented by formula (V):

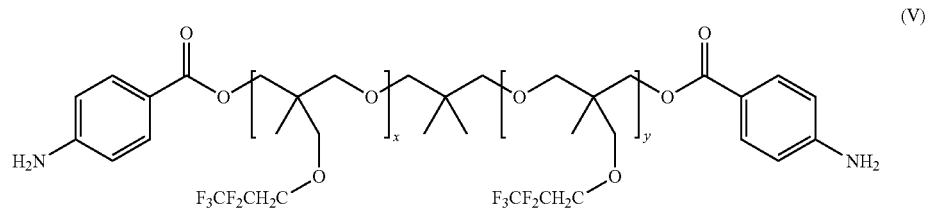

(V)

where x+y=4-5.
ATPAE 656 is represented by formula (VI):

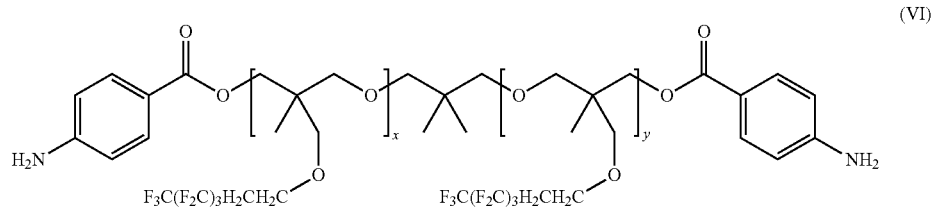

(VI)

where x+y=6.

ATPAE 154n is represented by formula (VI):

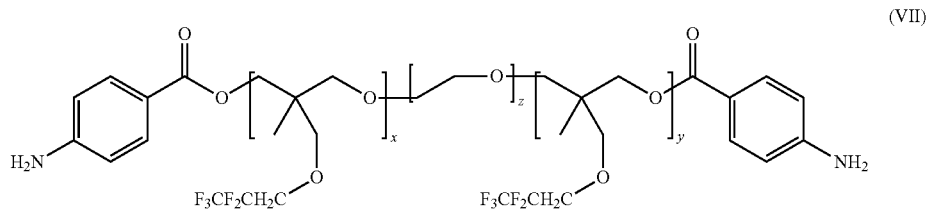

(VII)

where x+y=6 and z=33.

In these examples, the three components (epoxy resin, ATPAE, and curing agent) were weighed at the desired amounts, dissolved in MEK, followed by spray coating on an aluminum substrate, and thermally cured.

Example 6

Epoxy Modified with ATPAE and Fumed Silica

Modified epoxy samples with various concentrations of fumed silica were prepared following the process described in Example 5. The fumed silica was first weighed and dispersed in MEK, and subsequently added to the epoxy solution. This mixture was used to spray coat Al substrate followed by thermal curing as described in Example 1.

Example 7

Epoxy Modified with ATPAE and AEROXIDE® LE2 Silica

Modified epoxy samples with various concentrations of AEROXIDE® LE2 silica were prepared following the process described in Example 6.

Example 8

Epoxy Modified with ATPAE and MoS$_2$

Modified epoxy samples with various concentrations of MoS$_2$ were prepared following the process described in Example 6.

Example 9

Epoxy Modified with ATPAE More than One Filler

Modified epoxy samples with various concentrations of the three fillers were prepared following the process described in Example 6.

The various resin formulations prepared are detailed in Table I below.

TABLE 1

| | | Epoxy Compositions | | |
|---|---|---|---|---|
| Example | ATPAE Oligomer | ATPAE Conc., wt % | Fumed Silica Conc., wt % | AEROXIDE Conc., wt % | MoS$_2$ Conc., wt % |
| 1 | None | 0 | 0 | 0 | 0 |
| 2 | None | 0 | 25 | 0 | 0 |
| 3 | None | 0 | 0 | 40 | 0 |
| 4 | None | 0 | 0 | 0 | 25 |
| 5 | 7002 | 0.1 | 0 | 0 | 0 |
| 5a | 7002 | 0.5 | 0 | 0 | 0 |
| 5b | 7002 | 1.0 | 0 | 0 | 0 |
| 5c | 7002 | 5.0 | 0 | 0 | 0 |
| 5d | 636 | 0.5 | 0 | 0 | 0 |
| 5e | 656 | 0.5 | 0 | 0 | 0 |
| 5f | 154n | 0.5 | 0 | 0 | 0 |
| 5g | 6320 | 0.5 | 0 | 0 | 0 |
| 6 | 7002 | 1.0 | 5 | 0 | 0 |
| 6a | 7002 | 1.0 | 10 | 0 | 0 |
| 6b | 7002 | 1.0 | 25 | 0 | 0 |
| 7 | 7002 | 0.1 | 0 | 40 | 0 |
| 7a | 7002 | 0.5 | 0 | 40 | 0 |
| 7b | 7002 | 1.0 | 0 | 40 | 0 |
| 7c | 7002 | 5.0 | 0 | 40 | 0 |
| 7d | 636 | 0.5 | 0 | 40 | 0 |
| 7e | 656 | 0.5 | 0 | 40 | 0 |
| 7f | 154n | 0.5 | 0 | 40 | 0 |
| 7g | 6320 | 0.5 | 0 | 40 | 0 |
| 8 | 7002 | 1.0 | 0 | 0 | 5 |
| 8a | 7002 | 1.0 | 0 | 0 | 10 |
| 8b | 7002 | 1.0 | 0 | 0 | 25 |
| 9 | 7002 | 1.0 | 3.75 | 0 | 1.25 |
| 9a | 7002 | 1.0 | 7.5 | 0 | 2.5 |
| 9b | 7002 | 1.0 | 18.75 | 0 | 6.25 |
| 9c | 7002 | 1.0 | 30 | 0 | 10 |

The chemical structures of the ATPAEs used in the Examples are provided in Example 5 above. The molecular weights and amine equivalent weights were determined using $^1$H NMR spectroscopy. After applying the various epoxy formulations to Al substrates followed by thermal curing, they were characterized using contact angle goniometry.

TABLE 2

Characterization of Epoxy Compositions

| Ex. | ATPAE Oligomer | ATPAE Conc., wt % | Filler Type and (Quantity, wt. %) | Water Contact Angle, ⬜ Advancing (Receding) | Ethylene Glycol Contact Angle, ⬜ Advancing (Receding) | $CH_2I_2$ Contact Angle, ⬜ Advancing (Receding) |
|---|---|---|---|---|---|---|
| 1 | None | 0 | 0 | 100 (80) | 91 (58) | 59 (15) |
| 2 | None | 0 | $MoS_2$ (25) | 99 (78) | 75 (47) | 58 (33) |
| 3 | None | 0 | A (40) | 145 (113) | 76 (44) | 62 (20) |
| 4 | None | 0 | FS (25) | 131 (99) | 79 (47) | 78 (33) |
| 5 | 7002 | 0.1 | 0 | 106 (85) | 88 (52) | 93 (54) |
| 5a | 7002 | 0.5 | 0 | 104 (86) | 85 (54) | 86 (52) |
| 5b | 7002 | 1.0 | 0 | 105 (86) | 87 (56) | 88 (42) |
| 5c | 7002 | 5.0 | 0 | 103 (85) | 81 (49) | 83 (38) |
| 5d | 636 | 0.5 | 0 | 93 (75) | 71 (38) | 73 (46) |
| 5e | 656 | 0.5 | 0 | 100 (81) | 78 (40) | 74 (46) |
| 5f | 154n | 0.5 | 0 | 89 (70) | 69 (34) | 68 (31) |
| 5g | 6320 | 0.5 | 0 | 94 (75) | 73 (41) | 73 (36) |
| 6 | 7002 | 1.0 | FS (5) | 120 (99) | 92 (64) | 94 (58) |
| 6a | 7002 | 1.0 | FS (10) | 142 (107) | 133 (80) | 134 (58) |
| 6b | 7002 | 1.0 | FS (25) | 140 (128) | 137 (80) | 140 (129) |
| 7 | 7002 | 0.1 | A (40) | 145 (103) | 98 (67) | 66 (9) |
| 7a | 7002 | 0.5 | A (40) | 131 (103) | 94 (60) | 85 (40) |
| 7b | 7002 | 1.0 | A (40) | 142 (128) | 123 (78) | 118 (79) |
| 7c | 7002 | 5.0 | A (40) | 139 (107) | 121 (78) | 125 (64) |
| 7d | 636 | 0.5 | A (40) | 142 (107) | 74 (35) | 91 (24) |
| 7e | 656 | 0.5 | A (40) | 108 (86) | 75 (31) | 84 (22) |
| 7f | 154n | 0.5 | A (40) | 103 (81) | 74 (32) | 65 (13) |
| 7g | 6320 | 0.5 | A (40) | 124 (86) | 78 (37) | 54 (17) |
| 8 | 7002 | 1.0 | $MoS_2$ (5) | 105 (84) | 87 (57) | 86 (47) |
| 8a | 7002 | 1.0 | $MoS_2$ (10) | 105 (87) | 85 (59) | 94 (47) |
| 8b | 7002 | 1.0 | $MoS_2$ (25) | 112 (93) | 90 (60) | 83 (51) |
| 9 | 7002 | 1.0 | FS (3.75), $MoS_2$ (1.25) | 115 (96) | 97 (62) | 91 (64) |
| 9a | 7002 | 1.0 | FS (7.5), $MoS_2$ (2.5) | 143 (111) | 123 (80) | 134 (82) |
| 9b | 7002 | 1.0 | FS (18.75), $MoS_2$ (6.25) | 147 (135) | 141 (79) | 142 (125) |
| 9c | 7002 | 1.0 | FS (30), $MoS_2$ (10) | 142 (137) | 67 (36) | 116 (70) |

A = AEROXIDE silica,
FS = Fumed Silica

TABLE 3

Surface Energy of Epoxy Compositions

| Ex. | ATPAE Oligomer | ATPAE Conc., wt % | Filler Type and (Quantity, wt. %) | Surface Energy* (Standard Deviation), mN/m | | |
|---|---|---|---|---|---|---|
| | | | | Polar | Dispersive | Total |
| 1 | None | 0 | 0 | 6.6 (2.1) | 32.7 (5.7) | 39.3 (7.7) |
| 2 | None | 0 | $MoS_2$ (25) | 0.8 (0.7) | 27.9 (2.1) | 28.7 (1.6) |
| 3 | None | 0 | A (40) | 0.6 (0.2) | 26.4 (1.5) | 27.1 (1.3) |
| 4 | None | 0 | FS (25) | 1.2 (0.9) | 24.0 (4.0) | 25.2 (4.6) |
| 5 | 7002 | 0.1 | 0 | 2.3 (0.9) | 11.3 (1.2) | 13.7 (0.9) |
| 5a | 7002 | 0.5 | 0 | 1.9 (0.4) | 14.6 (1.2) | 16.5 (1.0) |
| 5b | 7002 | 1.0 | 0 | 3.3 (2.4) | 9.6 (4.6) | 13.0 (2.3) |
| 5c | 7002 | 5.0 | 0 | 1.9 (0.8) | 16.1 (1.2) | 18.0 (1.0) |
| 5d | 636 | 0.5 | 0 | 3.2 (0.3) | 20.9 (0.7) | 24.1 (0.5) |
| 5e | 656 | 0.5 | 0 | 1.6 (0.4) | 20.2 (1.3) | 21.8 (1.1) |
| 5f | 154n | 0.5 | 0 | 3.1 (0.3) | 20.5 (1.1) | 23.6 (0.8) |
| 5g | 6320 | 0.5 | 0 | 4.1 (2.3) | 22.7 (4.1) | 26.8 (2.7) |
| 6 | 7002 | 1.0 | FS (5) | 0.3 (0.3) | 12.5 (1.6) | 12.8 (1.4) |
| 6a | 7002 | 1.0 | FS (10) | 0.2 (0.1) | 1.2 (0.4) | 1.4 (0.3) |
| 6b | 7002 | 1.0 | FS (25) | 0.4 (0.2) | 0.6 (0.1) | 1.1 (0.1) |
| 7 | 7002 | 0.1 | A (40) | 5.4 (1.1) | 27.5 (3.0) | 32.9 (4.1) |
| 7a | 7002 | 0.5 | A (40) | 0.6 (0.5) | 17.3 (3.3) | 17.9 (3.8) |
| 7b | 7002 | 1.0 | A (40) | 0.2 (0.2) | 4.1 (1.6) | 4.3 (1.7) |
| 7c | 7002 | 5.0 | A (40) | 0.2 (0.1) | 3.0 (1.2) | 3.1 (1.1) |
| 7d | 636 | 0.5 | A (40) | 1.9 (1.8) | 21.3 (8.8) | 23.1 (10.5) |
| 7e | 656 | 0.5 | A (40) | 1.6 (1.7) | 18.8 (8.9) | 20.4 (7.5) |
| 7f | 154n | 0.5 | A (40) | 0.5 (0.2) | 25.8 (2.0) | 26.3 (1.9) |
| 7g | 6320 | 0.5 | A (40) | 2.0 (0.7) | 35.2 (1.5) | 37.2 (2.0) |
| 8 | 7002 | 1.0 | $MoS_2$ (5) | 1.7 (0.4) | 14.3 (0.3) | 15.9 (0.2) |
| 8a | 7002 | 1.0 | $MoS_2$ (10) | 3.0 (2.4) | 12.2 (5.1) | 15.2 (2.8) |
| 8b | 7002 | 1.0 | $MoS_2$ (25) | 0.4 (0.2) | 16.0 (1.3) | 16.4 (1.2) |
| 9 | 7002 | 1.0 | FS (3.75), $MoS_2$ (1.25) | 0.4 (0.2) | 12.2 (0.7) | 12.7 (0.6) |
| 9a | 7002 | 1.0 | FS (7.5), $MoS_2$ (2.5) | 0.1 (0.1) | 1.8 (0.4) | 1.9 (0.3) |
| 9b | 7002 | 1.0 | FS (18.75), $MoS_2$ (6.25) | 0.1 (0.1) | 0.6 (0.1) | 0.7 (0.1) |

TABLE 3-continued

Surface Energy of Epoxy Compositions

| Ex. | ATPAE Oligo-mer | ATPAE Conc., wt % | Filler Type and (Quantity, wt. %) | Surface Energy* (Standard Deviation), mN/m | | |
|---|---|---|---|---|---|---|
| | | | | Polar | Dispersive | Total |
| 9c | 7002 | 1.0 | FS (30), MoS$_2$ (10) | 0.1 (0.2) | 11.7 (2.6) | 11.8 (2.8) |

A = AEROXIDE ® LE2 Silica,
FS = Fumed Silica
*Calculated using advancing contact angle To emulate flight conditions under which insect impact events occur, controlled fruit fly impact studies were conducted inside a benchtop wind tunnel. Testing was conducted at ambient temperature (approximately 25° C.) and about 50 to 60% relative humidity. For each event, the airflow was turned on prior to feeding the insect into the insect insertion port. The suction force rapidly ejected the insect from the delivery port for impact on the test surface.

TABLE 4

Characterization of Epoxy compositions

| Example | ATPAE Oligomer | ATPAE Conc., wt % | Filler Type and (Quantity, wt. %) | Residue Height, μm | Aerial Coverage, mm$^2$ |
|---|---|---|---|---|---|
| 1 | None | 0 | 0 | 174 | 1.28 |
| 2 | None | 0 | FS (25) | 86.6 | 0.09 |
| 3 | None | 0 | A (40) | 99 | 0.13 |
| 4 | None | 0 | MoS$_2$ (25) | 240.9 | 1.38 |
| 5 | 7002 | 0.1 | 0 | 151 | 0.72 |
| 5a | 7002 | 0.5 | 0 | 184 | 0.96 |
| 5b | 7002 | 1.0 | 0 | 196 | 0.60 |
| 5c | 7002 | 5.0 | 0 | 197 | 0.59 |
| 5d | 636 | 0.5 | 0 | 238 | 1.66 |
| 5e | 656 | 0.5 | 0 | 208 | 1.14 |
| 5f | 154n | 0.5 | 0 | 210 | 0.68 |
| 5g | 6320 | 0.5 | 0 | 255 | 0.76 |
| 6 | 7002 | 1.0 | FS (5) | 87 | 0.07 |
| 6a | 7002 | 1.0 | FS (10) | 69 | 0.07 |
| 6b | 7002 | 1.0 | FS (25) | 104 | 0.08 |
| 7 | 7002 | 0.1 | A (40) | 166 | 0.15 |
| 7a | 7002 | 0.5 | A (40) | 98 | 0.13 |
| 7b | 7002 | 1.0 | A (40) | 81 | 0.12 |
| 7c | 7002 | 5.0 | A (40) | 184 | 0.60 |
| 7d | 636 | 0.5 | A (40) | 57 | 0.13 |
| 7e | 656 | 0.5 | A (40) | 190 | 0.83 |
| 7f | 154n | 0.5 | A (40) | 203 | 0.49 |
| 7g | 6320 | 0.5 | A (40) | 70 | 0.11 |
| 8 | 7002 | 1.0 | MoS$_2$ (5) | 175 | 0.43 |
| 8a | 7002 | 1.0 | MoS$_2$ (10) | 210 | 0.48 |
| 8b | 7002 | 1.0 | MoS$_2$ (25) | 127 | 0.48 |
| 9 | 7002 | 1.0 | FS (3.75), MoS$_2$ (1.25) | 45 | 0.02 |
| 9a | 7002 | 1.0 | FS (7.5), MoS$_2$ (2.5) | 66 | 0.06 |
| 9b | 7002 | 1.0 | FS (18.75), MoS$_2$ (6.25) | 145 | 0.22 |
| 9c | 7002 | 1.0 | FS (30), MoS$_2$ (10) | 125 | 0.19 |

A = AEROXIDE ® LE2 silica, FS = Fumed silica

After each impact event the airflow was maintained for an additional 5 s to simulate wind shear experienced during actual flight conditions. High-speed photography was obtained during impact events using a Vision Research Phantom 12 camera at a speed of 50,000 frames per second. This was repeated at least three times for each coating. The samples were subsequently characterized for insect residue heights and areal coverage and the results are presented in Table 4 and shown graphically in FIG. 1. FIG. 1 depicts the plot of aerial coverage versus residue height for all coating examples.

In analyzing the results, all of the compositions comprising fluorinated alkyl ether epoxy formulations exhibited lower aerial coverage compared to the control sample except one (example 5d), and in many cases were substantially less than that of the control. Thus, the compositions comprising fluorinated alkyl ether epoxies exhibited lower adhesion of the insect residue compared to the control epoxy. In many cases, samples containing fillers exhibited lower aerial coverage than the corresponding sample without filler.

Example 10

Substrate Adhesion Promotion Prior to Coating Deposition

Aluminum substrates were surface modified to promote adhesion by pretreatment with a diluted CHEMETALL® solution (1:7 V:V dilution with water) followed by a conversion coating application of Surface Treatment AC-131 (available from 3M™). Once prepared, the surfaces were spray coated with compositions described in Example 9.

Example 11

Cleanability of Coated Substrate

Coatings generated according to Example 10 were impacted with fruit flies and subsequently evaluated for cleanability. The surfaces were demonstrated to be readily cleaned of all adhered insect residue using a dampened cheesecloth.

Example 12

Preparation of a Coated Applique

Coatings generated according to Example 9 were spray coated onto adhesive-backed polyester and polyimide films and cured according to the manufacturer's instructions. The coated surface was determined to adhere to the adhesive backed material after curing and the coated substrate was demonstrated to readily bond to an aluminum substrate to act as an applique for mitigation of insect residues on aircraft surfaces.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

This written description uses examples to disclose the invention, including the best mode, and also to enable any person skilled in the art to make and use the invention. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An epoxy composition comprising a reaction product of:
    (i) at least one epoxy resin including at least one glycidyl, alicyclic epoxy, oxirane, or ethoxyline group; and
    (ii) at least one amino terminated fluorinated alkyl ether oligomer or polymer including at least one amine which reacts with the epoxy resin and at least one fluorinated pendant group which migrates to the surface of the epoxy composition.

2. The composition of claim 1, wherein the at least one amino terminated fluorinated alkyl ether oligomer or polymer is represented by formula (I):

$$(E)_y R^1-C(O)-O-[CH_2-CR^2R^3-CH_2-O]_m-C(O)-R^1(E)_y \quad (I)$$

wherein:
E comprises $-NH_2$;
y is 1;
$R^1$ is an aliphatic or aromatic hydrocarbon moiety of 1 to 10 carbon atoms;
$R^2$ is $-H$, $-F$, or an alkyl of 1 to 6 carbon atoms;
$R^3$ is $-F$, $-R^4H_{(n-a)}F_a$, $-R^5-O-R^4H_{(n-a)}F_a$, or $-O-R^4H_{(n-a)}F_a$, wherein $R^4$ is an alkyl or ether moiety of 1 to 30 carbons, $R^5$ is an alkyl moiety of 1 to 30 carbons, a is an integer of 3 to n, and n is twice the number of carbon atoms in the alkyl moiety plus 1; and
m is from 4 to 500.

3. The composition of claim 2, wherein $R^1$ is a divalent phenyl group; $R^2$ is alkyl of 1 to 3 carbon atoms; $R^3$ is $-R^5-O-R^4H_{(n-a)}F_a$, the omega carbon of $R^4$ has three fluoride substituents; $R^5$ is $-CH_2-O-C(X)_2-CF_3$, wherein X is $-H$ or $-F$; and m is between about 6 and 100.

4. The composition of claim 1, wherein the at least one amino terminated fluorinated alkyl ether oligomer or polymer is an oligomer represented by formula (II):

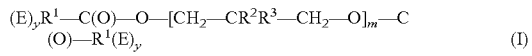

wherein:
E comprises $-NH_2$;
y is 1;
$R^1$ is aliphatic or aromatic hydrocarbon moiety of 1 to 10 carbon atoms;
Q is derived from the oligomerization of an oxetane monomer, wherein at least 40 mole percent of the oxetane monomer is substituted at the beta carbon with at least one substituent containing at least one perfluorinated carbon atom; and
m is between 4 to 500.

5. The composition of claim 4, wherein the substituted oxetane monomer from which Q is derived is represented by formula (III):

wherein $R^3$ is $-F$, $-R^4H_{(n-a)}F_a$, $-R^5-O-R^4H_{(n-a)}F_a$, or $-O-R^4H_{(n-a)}F_a$, wherein $R^4$ is an alkyl or ether moiety of 1 to 30 carbons, $R^5$ is an alkyl moiety of 1 to 30 carbons, a is an integer of 3 to n, and n is twice the number of carbon atoms in the alkyl moiety plus 1.

6. The composition of claim 1, wherein the at least one amino terminated fluorinated alkyl ether oligomer or polymer is a compound represented by formulas (IV), (V), (VI), or (VII):

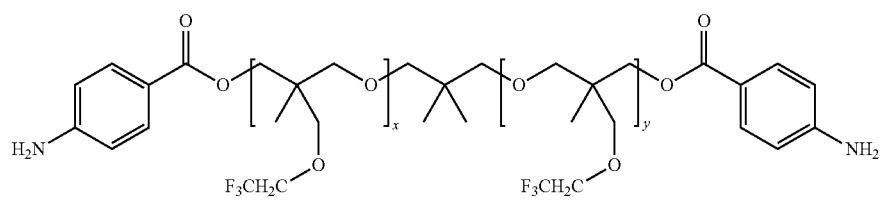

wherein x+y=6 or 20,

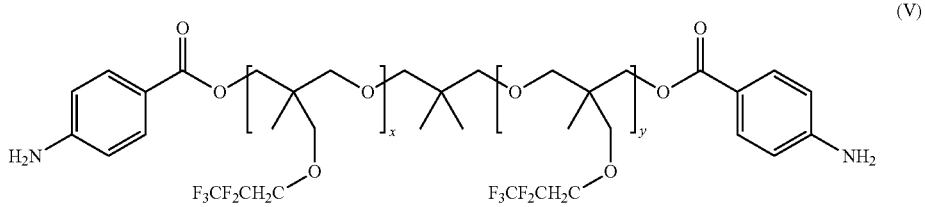

wherein x+y=4-5,

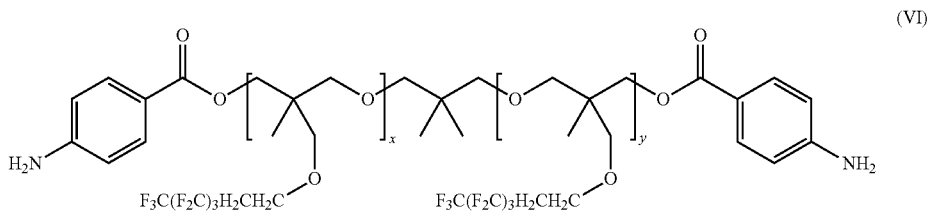

wherein x+y=6, or

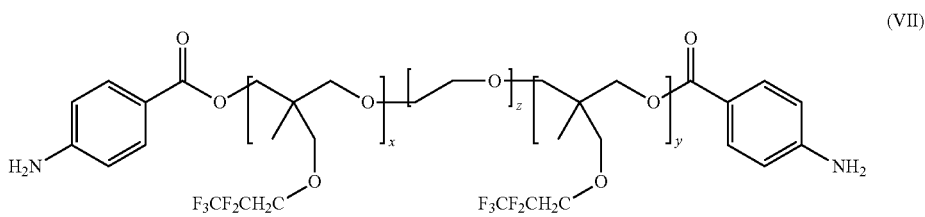

wherein x+y=6 and z=33.

7. The composition of claim 1, wherein the at least one amino terminated fluorinated alkyl ether oligomer or polymer is present in an amount of about 0.1 to 5 wt. % based on the total weight of the composition.

8. The composition of claim 1 further comprising a curing agent having one or more functional groups selected from the group consisting of amines, phenols, anhydrides, thiols, alcohols, organic carboxylic acids and salts, acyl chlorides, aldehydes, ketones, Grignard reagents, water, sodium hydroxide, inorganic acids and their salts, and any combinations thereof.

9. The composition of claim 8, wherein the curing agent is selected from the group consisting of 4,4'-methylenedianiline (MDA), isomers of diaminodiphenylsulfone (DDS), isomers of diaminodiphenylether (DDE), imidazole, hexamethylenediamine, polyamidoamine, dicyan diamide, and phenol novolak.

10. The composition of claim 1 further comprising an additive selected from the group consisting of fillers, fibers, surfactants, binders, crosslinking agents, diluents, coupling agents, thermal stability agents, flame retardant agents, anti-dripping agents, lubricants, mold release agents, nucleating agents, anti-static agents, catalysts, colorants, antioxidants, UV stabilizers, and any combinations thereof.

11. The composition of claim 1 further comprising a filler selected from the group consisting of silica, fumed silica, molybdenum disulfide, iron oxide, inorganic oxides, and any mixtures thereof, wherein the filler is present in an amount of about 5 to about 40 wt. % based on the total weight of the composition.

12. The composition of claim 1, wherein the epoxy composition has a surface energy of about 25 mN/m or less.

13. A process of producing an epoxy composition comprising:
reacting at least one epoxy resin including at least one glycidyl, alicyclic epoxy, oxirane, or ethoxyline group with at least one amino terminated fluorinated alkyl ether oligomer or polymer represented by formula (I):

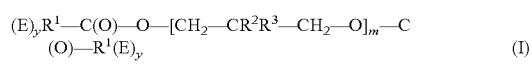

wherein:
E is —$NH_2$;
y is 1;
$R^1$ is an aliphatic or aromatic hydrocarbon moiety of 1 to 10 carbon atoms;
$R^2$ is —H, —F, or an alkyl of 1 to 6 carbon atoms;
$R^3$ is —F, —$R^4H_{(n-a)}F_a$, —$R^5$—O—$R^4H_{(n-a)}F_a$, or —O—$R^4H_{(n-a)}F_a$, wherein $R^4$ is an alkyl or ether moiety of 1 to 30 carbons, $R^5$ is an alkyl moiety of 1 to 30 carbons, a is an integer of 3 to n, and n is twice the number of carbon atoms in the alkyl moiety plus 1; and
m is between 4 to 500.

14. The process of claim 13 further comprising:
dissolving the at least one epoxy resin, the at least one amino terminated fluorinated alkyl ether oligomer or polymer, and optionally, at least one curing agent in a solvent;

spray coating the dissolved composition on a substrate; and curing the coating.

15. The process of claim 14, wherein the solvent is methyl ethyl ketone.

16. The process of claim 14, wherein the substrate is selected from the group consisting of glasses, ceramics, metals, metal alloys, polymers, carbon allotropes, and inorganic oxides.

17. The process of claim 14 further comprising applying a pretreatment to the substrate before spray coating the dissolved composition on the substrate to promote wetting and adhesion of the spray-deposited solution.

18. The process of claim 14, wherein the curing process is performed thermally, as a result of UV-light exposure, or occurs under ambient conditions.

19. A coated substrate comprising:
a substrate selected from the group consisting of glasses, ceramics, metals, metal alloys, polymers, carbon allotropes, and inorganic oxides; and
a coating obtained from a reaction product of at least one epoxy resin, at least one amino terminated fluorinated alkyl ether oligomer or polymer, and optionally, a curing agent applied to the substrate;

wherein the at least one epoxy resin includes at least one glycidyl, alicyclic epoxy, oxirane, or ethoxyline group; and the at least one amino terminated fluorinated alkyl ether oligomer or polymer is represented by formula (I):

$$(E)_y R^1 - C(O) - O - [CH_2 - CR^2 R^3 - CH_2 - O]_m - C(O) - R^1 (E)_y \qquad (I)$$

wherein:
E comprises $-NH_2$;
y is 1;
$R^1$ is an aliphatic or aromatic hydrocarbon moiety of 1 to 10 carbon atoms;
$R^2$ is $-H$, $-F$, or an alkyl of 1 to 6 carbon atoms;
$R^3$ is $-F$, $-R^4 H_{(n-a)} F_a$, $-R^5-O-R^4 H_{(n-a)} F_a$, or $-O-R^4 H_{(n-a)} F_a$, wherein $R^4$ is an alkyl or ether moiety of 1 to 30 carbons, $R^5$ is an alkyl moiety of 1 to 30 carbons, a is an integer of 3 to n, and n is twice the number of carbon atoms in the alkyl moiety plus 1; and
m is from 4 to 500.

20. The coated substrate of claim 19, wherein the coated substrate is configured to be readily cleaned of any residual contaminations.

* * * * *

UNITED STATES PATENT AND TRADEMARK OFFICE
CERTIFICATE OF CORRECTION

PATENT NO. : 9,550,911 B2
APPLICATION NO. : 14/310997
DATED : January 24, 2017
INVENTOR(S) : Christopher J. Wohl et al.

It is certified that error appears in the above-identified patent and that said Letters Patent is hereby corrected as shown below:

On the Title Page

--In the inventors, (72), correct the spelling of the second named inventor to --Frank L. Palmieri--

Signed and Sealed this
Fifth Day of June, 2018

Andrei Iancu
*Director of the United States Patent and Trademark Office*